United States Patent [19]

Stocker

[11] 3,842,326

[45] Oct. 15, 1974

[54] VELOCITY CONTROL SYSTEM FOR REEL-TO-REEL WEB DRIVE

[75] Inventor: Herman Walter Stocker, Ventura, Calif.

[73] Assignee: Burroughs Corporation, Detroit, Mich.

[22] Filed: July 27, 1973

[21] Appl. No.: 383,335

[52] U.S. Cl. ..................... 318/7, 318/318, 318/327, 340/174.1

[51] Int. Cl. ............................................ H02p 5/16

[58] Field of Search ... 318/6, 7, 314, 318, 326–328, 318/341; 340/174.1

[56] References Cited

UNITED STATES PATENTS

| | | | |
|---|---|---|---|
| 3,154,730 | 10/1964 | Houldin | 318/318 |
| 3,295,039 | 12/1966 | MacDonald | 318/318 |
| 3,748,552 | 7/1973 | Arthur | 318/7 |
| 3,764,087 | 10/1973 | Paananen | 318/6 |
| 3,764,888 | 10/1973 | Anderson | 318/318 |

*Primary Examiner*—Robert K. Schaefer
*Assistant Examiner*—Thomas Langer
*Attorney, Agent, or Firm*—Albin H. Gess; Edward G. Fiorito

[57] ABSTRACT

In a reel-to-reel drive wherein a web member is moved from a supply reel to a take-up reel by electrically driving the take-up reel, the velocity of the web is maintained constant, as the supply reel is loaded with the web member, by decreasing the rotational velocity of the take-up reel in proportion to the loading of the web member on the take-up reel. The speed of the moving web is derived digitally, the digital signals being compared in time of occurrence, for a predetermined sample length with a reference clock source. The time difference of occurrence between the actual digital web signal and the desired web speed or reference clock signal causes a voltage correction to be generated that is proportional in amplitude to the present take-up reel motor drive voltage and equal in duration to the time difference of occurrence between the actual digital web speed signal and the desired web speed signal.

In instances where the web member is a magnetic tape with magnetically encoded digital data thereon in record lengths that are shorter than the predetermined sample length and having inter-record gaps, an approximate voltage correction is generated in proportion to the time difference of occurrence between the actual web speed signal and a reference signal, on a bit-to-bit basis. If the digital web speed indication is derived from a clock track on the magnetic tape, the occurrence of inter-record gaps, exhibiting the absence of clock information, will cause the generation of a driving voltage for the reel motor that will maintain, at least for the length of the inter-record gap, take-up reel velocity at the level existing at the time the inter-record gap occurred.

15 Claims, 5 Drawing Figures

FIG. 4

| | A | B | C | D | E | F | G | H | J | K | L | M | N | O | P | R | S |
|---|---|---|---|---|---|---|---|---|---|---|---|---|---|---|---|---|---|
| $t_1$ | 1 | 0 | 1 | 0 | 1 | 0 | 1 | 0 | 1 | 0 | 1 | 0 | 1 | 1 | 0 | 1 | 1 |
| $t_2$ | 0 | 0 | 0 | 0 | 0 | 0 | 0 | 0 | 1 | 0 | 1 | 0 | 1 | 1 | 0 | 1 | 1 |
| $t_3$ | 0 | 1 | 0 | 0 | 0 | 0 | 0 | 1 | 0 | 0 | 1 | 1 | 1 | 0 | 0 | 0 | 1 |
| $t_4$ | 0 | 0 | 0 | 1 | 0 | 0 | 0 | 1 | 0 | 1 | 0 | 1 | 0 | 0 | 1 | 1 | 1 |
| $t_5$ | 0 | 0 | 1 | 0 | 1 | 1 | 1 | 0 | 1 | 0 | 1 | 0 | 1 | 1 | 0 | 1 | 1 |
| $t_6$ | 0 | 0 | 0 | 0 | 0 | 0 | 0 | 0 | 1 | 0 | 1 | 0 | 1 | 1 | 0 | 1 | 1 |
| $t_7$ | 0 | 0 | 0 | 1 | 0 | 0 | 0 | 0 | 1 | 1 | 0 | 0 | 0 | 1 | 1 | 1 | 0 |
| $t_8$ | 0 | 1 | 0 | 0 | 0 | 0 | 0 | 1 | 0 | 1 | 0 | 1 | 0 | 0 | 1 | 1 | 1 |
| $t_9$ | 0 | 0 | 1 | 0 | 1 | 1 | 1 | 0 | 1 | 0 | 1 | 0 | 1 | 1 | 0 | 1 | 1 |
| $t_{10}$ | 0 | 0 | 0 | 0 | 0 | 0 | 0 | 0 | 1 | 0 | 1 | 0 | 1 | 1 | 0 | 1 | 1 |
| $t_{11}$ | 0 | 1 | 0 | 1 | 0 | 0 | 0 | 1 | 0 | 1 | 0 | 1 | 0 | 0 | 1 | 1 | 1 |
| $t_{12}$ | 0 | 0 | 1 | 0 | 1 | 1 | 1 | 0 | 1 | 0 | 1 | 0 | 1 | 1 | 0 | 1 | 1 |
| $t_{13}$ | 0 | 0 | 0 | 0 | 0 | 0 | 0 | 0 | 1 | 0 | 1 | 0 | 1 | 1 | 0 | 1 | 1 |

VELOCITY CONTROL SYSTEM FOR REEL-TO-REEL WEB DRIVE

BACKGROUND OF THE INVENTION

The present invention relates generally to improvements in reel-to-reel web driving mechanisms and more particularly pertains to new and improved web velocity control systems for reel-to-reel web drives wherein the velocity of the moving web member is controlled by regulating the rotational velocity of the take-up reel for the web member.

In the field of capstanless web driving mechanisms, such as magnetic tape disk pack drives, the prior art has attempted to provide for constant linear velocity of the web member at a read/write station by controlling the rotational velocity of the web take-up reel.

In a prior art technique, taught by K. E. Pope in his patent for "Apparatus for Controlling Tape Speed" (U.S. Pat. No. 3,665,438), the drive motor for driving a take-up reel is supplied with electrical energy from an oscillator through a gate. The gate is responsive to pulse signals read from a track pre-recorded on the tape. These signals cause the gate to close and shut off the supply of electrical energy to the reel motor. Therefore, the higher the frequency of the signals read from the tape (the faster the tape velocity), the less the energy that will be supplied to the reel motor and, conversely, the lower the frequency of these signals (the slower the tape velocity) the greater the energy that will be supplied to the reel motor.

Other prior art techniques for controlling the rotational velocity of the take-up reel by controlling the voltage supplied to the reel-driving motor involve the use of a revolution counter, rather than a series of pre-recorded signals on the tape, to regulate the energy that is being supplied to the reel-driving motor. In this type of system, the output of the revolution counter, which is counting the revolutions of the take-up reel, regulates the electrical energy supplied to the reel-driving motor.

Prior art systems, such as the two briefly described, provide speed regulation of the tape member by controlling the rotational velocity of the take-up reel. However, these methods of speed control are not of the accuracy desired or necessary in high performance units. The two prior art techniques described above fail to take into consideration all the variables that are inherent in this type of velocity loop. In the system that supplies electrical energy to the take-up reel motor from an oscillator through a gate, for example, the amplitude of the oscillator signal is of some predetermined constant level, thereby relying solely on the pulses read from the moving tape to regulate electrical energy supplied to the motor. This causes the motor to respond with velocity fluctuations that are wider than would be the case if it was being supplied with a smoothly varying voltage level rather than erratically spaced voltage pulses. In the prior art technique utilizing a take-up reel rotation counter to regulate electrical energy supplied to the take-up reel motor, additional factors such as hub variation on the take-up reel, tape thickness variation, system loading, etc., that vary from one drive system to another, are not accounted for and, consequently, will introduce errors into the speed control loop.

SUMMARY OF THE INVENTION

An object of this invention is to provide an improved velocity control system for a reel-to-reel web drive.

Another object of this invention is to provide improved error correction signal generating circuitry for a reel-to-reel web drive.

A further object of this invention is to provide improved error correction signal generating circuitry for a reel-to-reel magnetic tape drive having short records recorded thereon.

These objects and the general purpose of this invention are accomplished by deriving a web velocity time error indication by digital logic circuitry and utilizing this time error indication to apply a correction voltage to the reel drive motor that is proportional, in amplitude, to the voltage driving the motor at the time the velocity correction is made and equals, in duration, the time error indication. If, for any reason, the web velocity indication is not obtainable, the reel drive motor is supplied, for a relatively long interval, with a voltage level that was present at the motor when the web velocity indication stopped.

BRIEF DESCRIPTION OF THE DRAWINGS

Other objects and many of the attendant advantages of this invention will be readily appreciated as the same become better understood by reference to the following detailed description when considered in conjunction with the accompanying drawings in which like reference numerals designate like parts throughout the figures thereof and wherein:

FIG. 4 is a state diagram illustrating the states of specific logic circuitry of FIG. 3.

DESCRIPTION OF THE PREFERRED EMBODIMENTS

Figure 1:
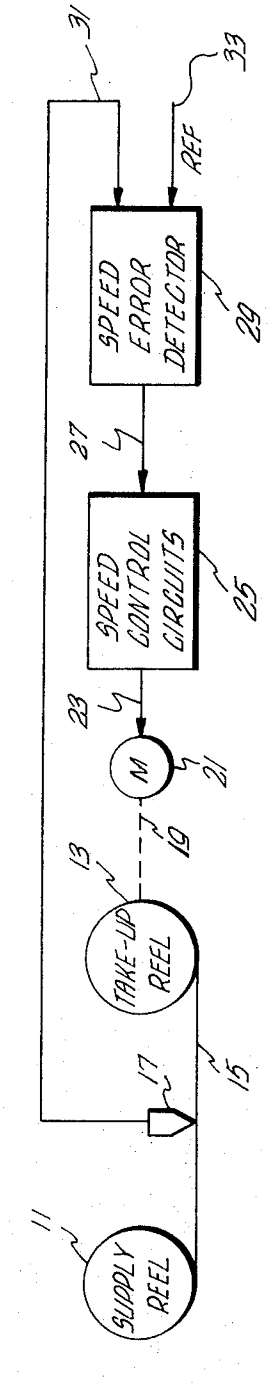
FIG. 1 illustrates in block diagram form the overall speed control loop for a reel-to-reel web drive.

Referring first to FIG. 1, the invention is illustrated as embodied in a reel-to-reel magnetic tape transport system. However, it should be understood that the present invention is equally useful in any web transport system such as in a magnetic tape, paper tape, cloth or any other rollable material transport system. The web material 15, which shall for purposes of explanation be assumed to be magnetic tape, is driven past a read/write station 17 by driving a take-up reel 13 in a direction that will unwind the tape 15 from a supply reel 11.

The take-up reel 13 may be driven by a linear DC motor 21 that is mechanically coupled 19 to the shaft of rotation of the take-up reel 13. The motor 21 is supplied a driving voltage, over conductors 23, from speed control circuits 25, which will be more specifically described hereinafter. These speed control circuits 25 generate voltage levels for the motor 21 in response to speed error correction signals received, on lines 27, from speed error detector circuits 29. These speed error detector circuits will be described more specifically hereinafter. The speed error detector circuits 29 generate speed error correction signals by comparing, in time of occurrence, signals received on line 33, that represent desired tape velocity with signals received on line 31, that represent actual tape velocity. These actual tape velocity signals may be pulses read from the magnetic tape medium 15 by a head 17 or they may be generated by an optical tachometer, which is well known in the art for generating an AC signal, the frequency of which determines the velocity of the tape.

Figure 2:
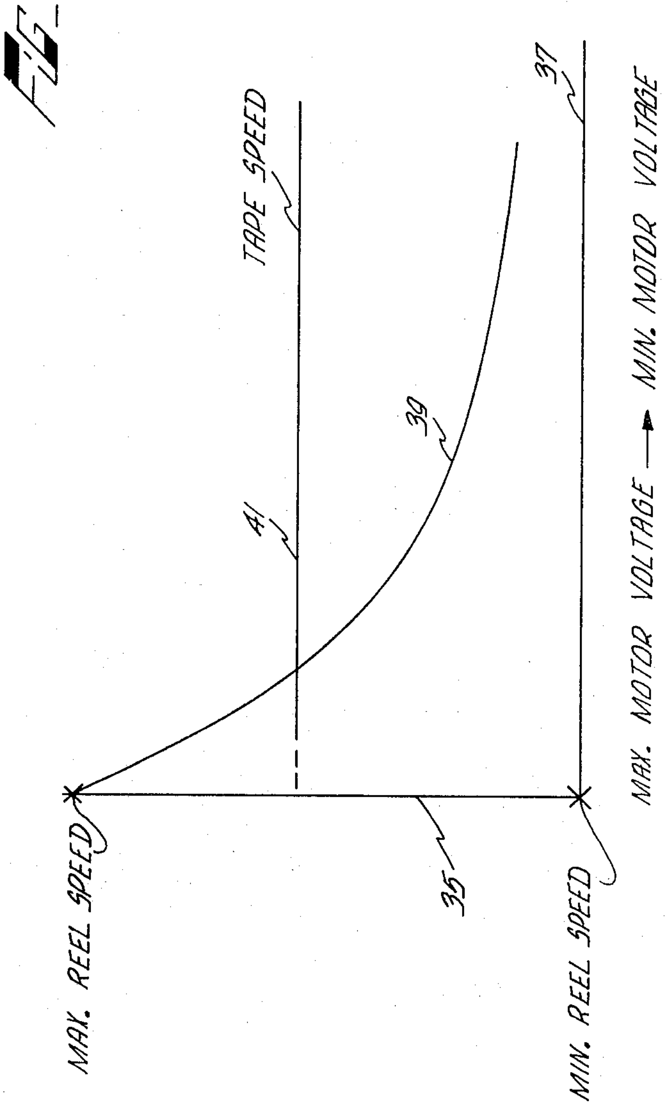
FIG. 2 is a graph representative of the relationship of motor voltage to take-up reel speed and tape speed.

Referring now to FIG. 2, the relationships of motor voltage to take-up reel speed and tape speed are illustrated with the motor voltage plotted on the X axis 37 and the reel speed plotted on the Y axis 35. In order to keep the velocity of the tape constant for the entire cycle as the take-up reel loads with the tape medium, the take-up reel speed must be decreased proportionately to the increase in the reel hub diameter, as the tape is loaded on the take-up reel. The effective diameter on which the tape is wound is increased by the thickness of the tape after each revolution. By experimentation, it has been determined that the relationship of take-up reel speed to tape velocity is as illustrated by the curves 39 and 41 of the graph. That is, in order to keep the tape velocity 41 constant, the reel speed must follow curve 39 from a predetermined maximum reel speed down to a predetermined minimum reel speed which occurs when the last length of tape is being loaded on the take-up reel. In order to force the speed of the take-up reel, which is mechanically linked to the motor, to follow this curve 39, the motor velocity must follow this curve 39. This is accomplished by regulating the voltage, for example, to the armature windings of the motor so that this voltage varies in proportion to curve 39. Supplying the motor with a driving voltage that closely follows the take-up reel speed curve 39 will cause the tape velocity 41 to be constant, as illustrated, since motor voltage is proportional to motor velocity. It can be assumed that the losses in the mechanical coupling 19 (FIG. 1) between the motor and the take-up reel are negligible or easily compensated for.

Figure 3:
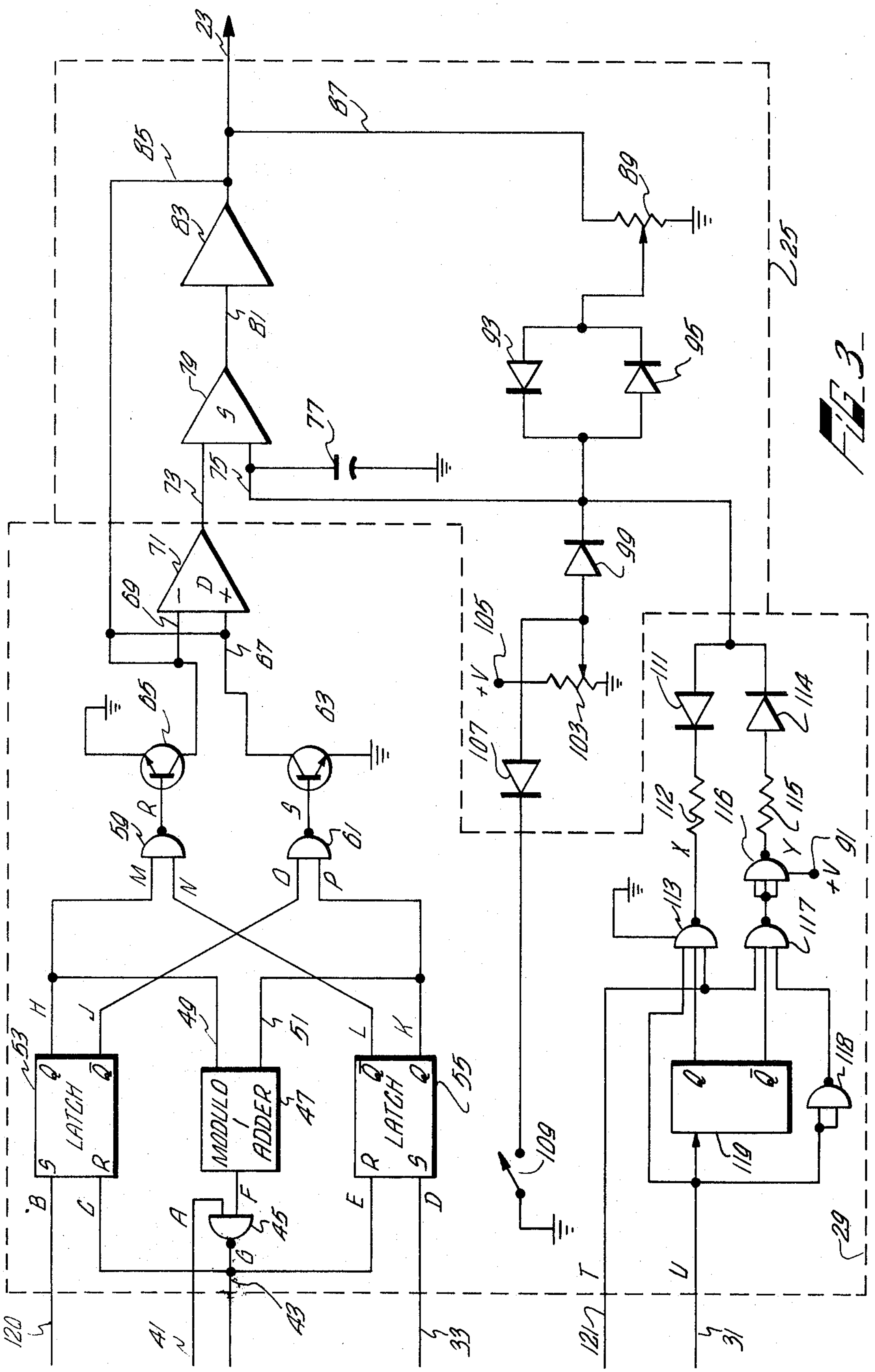
FIG. 3 is a schematic/logic diagram of specific speed-error detector circuitry and speed-control circuitry that may be utilized in the system illustrated in FIG. 1.

Referring now to FIG. 3, wherein the preferred embodiments of the speed control circuits and speed error detector circuits of FIG. 1 are illustrated, the specific arrangement of the circuits in FIG. 3 are of greatest utility for a reel-to-reel magnetic tape transport such as a cassette drive. It should be understood, however, that the circuits are not limited to such a specific application and may be used in any reel-to-reel web transport system. For the sake of simplicity of explanation and ease of understanding, the description will proceed with reference only to a reel-to-reel magnetic tape transport system.

The speed of the magnetic tape is determined by reading a prerecorded clock track on the tape. The clock signals sensed are supplied to the speed error detector circuits 29 over line 31. These clock signals are the tape velocity indicating signals. The speed error detector circuits 29 consist of two separate time error signals generating circuits. The first time error signals generating circuit is made up of a one-shot multivibrator 119 supplying its Q and $\bar{Q}$ outputs to a pair of NAND gates 113, 117. The second time error signal-generating circuit is made up of a pair of latches 53, 55 supplying their Q and $\bar{Q}$ outputs to a pair of NAND gates 59 and 61. This second time error signals generating circuit receives a divided clock signal on line 120, the division factor used defining the sampling rate of the tape velocity indicating signal. In addition to the clock signals, the speed error detector circuits receive a start level on line 41, an inter-record gap level on line 43, a reference signal train from a device such as a crystal oscillator on line 33, this reference signal train representing the desired tape velocity, and a disable level on line 121.

The outputs of the two NAND gates 59, 61, that are part of the second time error signals generating circuit, respectively bias a pair of transistor switches 65, 63 on or off, depending on the logic level generated by the NAND gates. The transistor switches are connected, respectively, to two inputs 69 and 67 of a differential amplifier 71, input 69 being an inverting input and input 67 being a non-inverting input. A summing amplifier 79 receives the output voltage of the differential amplifier 71 on line 73 and whatever voltage is stored on a capacitor 77 connected to its other input 75. The sum of the two voltages on lines 73 and 75 of the summing amplifier 79 is supplied through a power amplifier 83, which may be, for example, an emitter-follower type, on line 23 to a take-up reel driving motor. This same voltage is, additionally, fed back, on line 85, to both inputs 69 and 67 of the differential amplifier 71. Also, this same motor driving voltage is supplied over line 87, through a network made up of a variable resistor 89 and diodes 93, 95 to the positive terminal of the capacitor 77. This, of course, is a positive feed-back loop. The capacitor 77 also has a positive voltage source connected to its positive terminal by way of a network made up of a variable resistance 103, and a diode 99.

Prior to start-up, the capacitor 77, connected to one of the inputs 75 of the summing amplifier 79, is charged to an initial start voltage from the positive voltage source 105 through the network made up of variable resistor 103 and diode 99. This initial charge is the voltage necessary at start-up to produce, as rapidly as possible, the desired steady state velocity in the transport system. The exact value of this voltage is determined by routine experimentation. At the instant of start-up, switch 109 is closed thereby removing the voltage source 105 from the circuit. Switch 109 may be an electronic switch actuated by a start command, in a manner well known in the art.

The initial charge on the capacitor 77 will be amplified and supplied to the driving motor over line 23, causing the tape to accelerate. As soon as the tape starts moving, the clock signals read from the prerecorded clock track on the tape are supplied, according to a predetermined optimized sample rate determined by choosing the division factor, to latch 53 on line 120, part of the second time error signals generating circuit, and as read from the tape, to one-shot multivibrator 119, part of the first time error signals generating circuit. Both circuits generate signals that indicate the errors between the occurrences of the signals representing actual web velocity and the signals representing desired web velocity in a manner that will be more specifically described hereinafter. The first time error signals generating circuit will be disabled by a low on line 121 if a counter (not shown) in the drive system goes beyond a predetermined count which is greater than the number of bits that can be presented per sample at the sample rate supplied to the latch 53 over line 120. Whenever the modulo of this bit counter is exceeded, the second time error signals generating circuit begins to regulate the tape velocity. Thus, it can be seen that the first time error signals generating circuitry utilizing the one-shot multivibrator 119, only generates time error indicating signals for short records, in a manner that will be more specifically disclosed hereinafter.

Assuming first that a long record is being read, the second time error signal generating circuitry, utilizing latches 53 and 55 cause either NAND gate 59 or 61 to open their respective switches 65, 63 thereby causing a differential voltage across the inputs 69, 67 of the differential amplifier 71. If the time error signal derived indicates that the tape is going too fast, for example, switch 65 will be opened causing the output of differential amplifier 71 to be a negative voltage the amplitude of which equals the amplitude of the voltage being supplied to the drive motor and the duration of which equals the time error of occurrence between the sample rate signal, indicating actual tape velocity, on line 120 and the desired tape velocity signal on line 33. This negative voltage is supplied to the summing amplifier 79 which causes this amplitude of voltage to be subtracted from the voltage on capacitor 77 for the time error interval present, thereby reducing the speed of the take-up reel drive motor. Needless to say, if the tape were going too slow, the other gate 63 would be opened causing a positive voltage to be added to the voltage on capacitor 77, the sum of these two voltages causing the drive motor to speed up.

The time error signals supplied to the summing amplifier 79 at its input 73 will force the voltage output of the power amplifier 83, on line 23, to follow curve 39 (FIG. 2). The positive feed-back loop from the output of the power amplifier 83 on line 87, to the other input 75, of summing amplifier 79 through the network of variable resistance 89 and the diode pair 93, 95, will cause the voltage on the capacitor 77 to follow the decreasing voltage being supplied to the take-up reel driving motor. The diode pair 93, 95 is chosen to have a certain amount of hysteresis which is sufficient to prevent the gain of the loop from exceeding unity and thereby causing the loop to oscillate.

Whenever the voltage on line 87 is greater than the voltage across the capacitor 77, current will flow through the resistance 89, and diode 93 to charge the capacitor 77 until the voltage drop across the diode 93 is very small and the current flow stops. The hysteresis characteristic of both diodes 93, 95 causes the current to stop flowing before a zero voltage drop across either diode occurs. When the charge across the capacitor 77 is greater than the voltage being supplied to the motor on line 23, the current will flow from the positive side of capacitor 77, through diode 95 and resistor 89 to ground until the potential drop across diode 95 is very small. By causing the voltage across the capacitor 77 to follow the decreasing voltage being applied to the drive motor, in this manner, curve 39 (FIG. 2) is very closely approximated.

The operation of both time error signals generating circuits will now be explained. Considering first the second time error signals generating circuit, utilizing the two latches 53, 55, the latch 53 receives a binary signal on line 120 at its set input every so many clock bits. The length of this sample time is chosen for optimum system operation in a manner well known to those of ordinary skill in the art. This sample signal is a representation of the actual tape velocity. A NAND gate 45 receives a start level, on line 41, and the output of a modulo one adder 47. A reference or desired tape velocity signal having a repetition rate that is equal to the sample length chosen for the binary signals on line 120 is received by the other latch 55 at its set input, on line 33.

Referring now to FIG. 4, at time $t_1$ the outputs H and J of latch 53 and outputs K and L of latch 55 are in the reset state, 0 1, 0 1, respectively. The output of the modulo one adder 47 in response to two zeros, or lows, is also a low. The inputs to the NAND gates 59 and 61 are 0 1, 0 1, respectively, causing their outputs R and S to both be high. Thereby, switches 65 and 63 are biased to conduct. This produces a zero differential across the input terminals 67, 69 of the differential amplifier 71 causing a zero voltage output on line 73 to be supplied to the summing amplifier 79. When a start level is supplied over line 41 to one input of NAND gate 45 the output G of the NAND gate 45 goes high causing the high to be supplied to the reset inputs C, E of latches 53, 55, respectively. This start level acts to reset the latches 53 and 55 if they were originally in the set state. At time $t_2$, when the start level drops to a low the outputs H, J, and K, L of the latches 53, 55, respectively, remain as reset, causing the NAND gate 59, 61 to continue generating highs.

Assuming now, for the sake of example, that the actual tape velocity indication signal on line 120 is received at time $t_3$ causing a high at the set input B of the latch 53, the latch will respond with a high at its Q output and a low at its $\overline{Q}$ output. This will produce two highs at the inputs M, N of NAND 59 causing the output R of the NAND gate 59 to become low, biasing switch 65 off. This action places a positive differential across the input terminal 67, 69 of the differential amplifier 71 causing a positive voltage level to be sent to the summing amplifier 79 on line 73, ultimately speeding up the take-up reel drive motor. The voltage output of the differential amplifier 71 is present on line 73 until the desired tape velocity signal is received on line 33. Assume that this desired tape velocity signal is received at time $t_4$ causing a high at the set input D of latch 55. The latch will respond thereto to generate a high at its Q output and a low at its $\overline{Q}$ output. This causes the two inputs M, N of NAND gate 59 to be a 0 and 1 causing its output R to return to a high, thereby biasing switch 55 on and again causing a zero voltage differential across the input terminals 67, 69, of the differential amplifier 71.

Both input lines 49, 51 of the modulo one adder 47 have now been high since both Q outputs of the latches 53, 55 have been high. Modulo one adder 47 responds to two highs in sequence by generating a high at its output F. This high is supplied to NAND gate 45 causing it to have a high at its output G that resets both latches 53, 55. This occurs at time $t_5$. At time $t_6$, after both latches are reset, the circuitry assumes the states illustrated in FIG. 4.

Assuming now, at time $t_7$, that the desired tape velocity signal is received prior to the actual tape velocity signal, a high will be presented to the set input D of latch 55 on line 33. The states would be as illustrated at time $t_7$ of FIG. 4 causing the outputs of NAND gate 61 to drop to a low thereby biasing switch 63 off. This produces a negative differential across the input terminal 67, 69 of the differential amplifier 71, in turn, producing a negative voltage on line 73 to the summing amplifier 79 that subtracts from the positive voltage stored on capacitor 77. This negative voltage is presented to the input of the summing amplifier 79 until the actual tape velocity speed indicating signal is received by latch 53 at its set input B on line 120, at time $t_8$. When this occurs, as can be seen from FIG. 4, the output S of NAND gate 61, again goes high causing a zero differential across the inputs 69, 67 of the differential amplifier 71. Again, the modulo one adder 47, because of the highs generated by the Q outputs of both latches 53, 55, generates a high at its output F causing a reset pulse to be generated by the NAND gate 45, resetting both latches to the states shown at $t_9$ of FIG. 4. Time $t_{10}$ illustrates the states of the circuitry after this reset pulse.

Assuming now, at time $t_{11}$, that both an actual tape velocity indicating signal, on line 120, and a desired tape velocity indicating signal on line 33 are received simultaneously, both outputs R and S of NAND gates 59, 61, respectively, will remain high. Modulo one adder 47 generates a high immediately at $t_{12}$ causing the latches 53, 55 to be reset. Time $t_{13}$ illustrates the states of the latches after this reset pulse.

The specific operation of the first time error signals generating circuitry utilizing a one-shot multivibrator 119 will now be explained with reference to FIG. 5. The actual clock signals read from the tape are supplied to the triggering input, U of one-shot multivibrator 119, over line 31. These clock signals represent the actual tape velocity. As can be seen from FIG. 5 each clock signal is a pulse of a certain constant width, the distance therebetween, however, varying as the tape velocity past the read head varies. The one-shot multivibrator 119 has an R-C time constant that causes it to time-out after being triggered by the falling edge of a previous clock signal at the instant that the rising edge of the next clock signal is being received, if the tape were travelling at the desired velocity.

Figure 5:
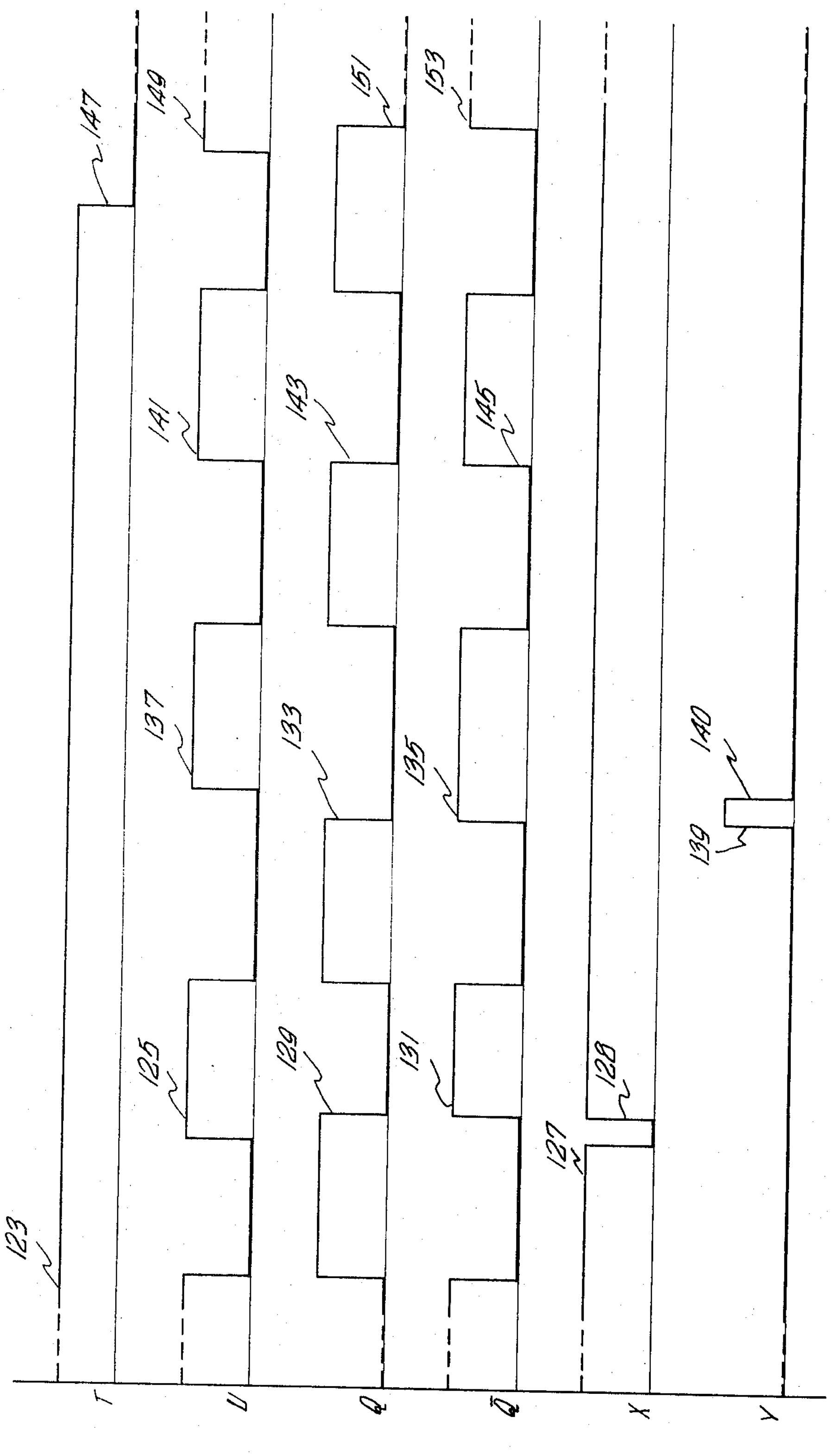
FIG. 5 is a pulse-diagram illustrating the signal levels existing in specific logic circuitry of FIG. 3.

Assume, for example, that the falling edge of the first clock signal triggers the one-shot multivibrator 119 to have a high Q output and a low $\overline{Q}$ output as illustrated in FIG. 5. Assume now that the rise of the next clock signal 125 occurs prior to the time-out or the fall of the Q output of the one-shot multivibrator 119. This situation indicates that the actual tape velocity is faster than desired. This condition will cause the NAND gate 113 to have an output X at 127 that falls from a high to a low. With the logic level of NAND gate 113 low, the diode 111 is no longer back-biased, thereby it acts as a closed switch causing the voltage across the capacitor 77 to discharge, through diode 111 and resistor 112, to ground, which is located within NAND gate 113. This discharge will continue until the Q output of one-shot multivibrator 119 drops to a low at time-out 129 and the $\overline{Q}$ output 131 goes to a high. At this instant the output X at 128 goes high again back-biasing the diode 111 to open the discharge path for capacitor 77. The fall of that clock signal again sets the one-shot multivibrator 119 to generate a high at its Q output and a low at its $\overline{Q}$ output.

Assume now that one-shot multivibrator 119 times-out before the next rise of the clock signal U at 137 is received. In such a case, the Q output 133 will fall to a low and the $\overline{Q}$ output 135 will go to a high. This causes the Y output of NAND gate 116 to, in effect, go high at 139 causing a positive voltage source 91 connected to NAND gate 116 to produce a current flow through resistor 115 and diode 114 to capacitor 77, thereby charging it. This charging path exists until the occurrence of the rise of the next clock pulse U at 137. This causes the Y output at 140 of NAND gate 116 to effectively go to a low thereby disconnecting or discontinuing this discharge path.

Assume now, that at the next rise 141 of the actual tape velocity indicating signal U the one-shot multivibrator 119 has a Q output signal 143 that drops to a low and a $\overline{Q}$ output 145 that goes to a high simultaneously with the occurrence of the rise 141 in the tape velocity indicating signal. In response thereto, both outputs X, Y of NAND gates 113 and 116, respectively, will not change, X remaining high and Y remaining low, thereby neither charging or discharging capacitor 77.

This manner of speed regulation, as illustrated, has occurred for three clock signals and was permitted because of a high 123 on line 121 which is an enable line to both NAND gates 113 and 117. If the signal on line 121 drops to a low at 147 both NAND gates 113 and 117 are disabled and situations such as a clock rise 149 occurring prior to the time-out fall 151 of the one-shot multivibrator 119 will not change the outputs X, Y of the respective NAND gates 113, 116. As was noted above, the signal on line 121 will drop to a low whenever the modulo of a short record bit counter is exceeded.

Referring to FIG. 3 now, when an inter-record gap is being encountered by the read head, the signal on line 121 would be low inhibiting the outputs of NAND gates 113 and 117 and the level on line 43 would be a high causing latches 53, 55 to remain in a reset condition. In such a situation the charge across the capacitor 77 connected to one of the inputs 75 of the summing amplifier 39 will maintain the voltage, on line 23, supplied to the take-up reel driving motor at the voltage level that was last present, on line 23, when all actual velocity indication signals were lost, or, in other words, the inter-record gap was entered. This voltage level will be maintained for a time that is dependent upon the leakage characteristics of the capacitor itself.

In view of the above discussion it can be seen that this invention provides an improved velocity control system for a reel-to-reel web drive that utilizes improved error correction signal generating circuitry which can provide error correction signals for reel-to-reel magnetic tape drives that have very short records recorded thereon and is also capable of maintaining velocity in spite of a loss of the actual velocity indicating signals. Obviously many modifications and variations of the present invention are possible in light of the above teachings. It is therefore to be understood that within the scope of the appended claims the invention may be practiced otherwise than as specifically described.

What is claimed is:

1. A web velocity control system for a reel-to-reel web drive, having an electric motor for driving the take-up reel of a take-up reel, supply reel pair, comprising:

means for generating signals indicative of the time errors between the occurrences of an actual web velocity signal and a desired web velocity signal;

means, responsive to said time error indicating signal generating means, for generating web velocity correction signals that are proportional, in amplitude, to the voltage being supplied to drive the take-up reel motor and equal, in duration, to the time errors indicated by the time error indicating signals;

means, responsive to the voltage being supplied to drive the take-up reel motor, for dynamically storing its instantaneous value; and means for combining the web velocity correction signals, from said web velocity correction signals generating means, and the instantaneous value of the voltage being supplied to drive the take-up reel motor, from said dynamically storing means, the combined voltage being supplied to drive the take-up reel motor.

2. The web velocity control system of claim 1 wherein said time error signals generating means, comprises:

first latch means for receiving binary signals at a frequency indicative of the actual velocity of the web member and generating binary signals in response thereto;

second latch means for receiving binary signals at a frequency indicative of the desired velocity of the web member and generating binary signals in response thereto; and logic circuit means, responsive to the binary signals from said first and second latch means, for generating a first binary output when the actual web velocity indication signals are being received prior to the desired web velocity indication signals and generating a second binary signal when the desired web velocity indication signals are being received prior to the actual web velocity indication signals.

3. The web velocity control system of claim 2 wherein said web velocity correction signals generating means, comprises:

a first gate means responsive to the first binary output from said logic circuit means for closing in response thereto;

a second gate means responsive to the second binary output from said logic circuit means for closing in response thereto; and a differential, dual input, amplifier having an inverting input and a non-inverting input, said first gate means being connected to the non-inverting input.

4. The web velocity control system of claim 1 wherein said web velocity correction signals generating means, comprises:

first gate means responsive to said time error indicating signal generating means for closing in response thereto;

second gate means responsive to said time error indicating signal generating means for closing in response thereto; and a differential, dual input, amplifier having an inverting input and a non-inverting input, said first gate means being connected to the inverting input and said second gate means being connected to the non-inverting input, the output of said amplifier being the web velocity correction signals.

5. The web velocity control system of claim 4 wherein said combining means comprises:

a two input summing amplifier, the first input being the web velocity correction signals from said differential amplifier.

6. The web velocity control system of claim 5 wherein the output voltage of said summing amplifier is supplied to said electric motor to drive it, and is also supplied to both the inverting and non-inverting inputs of said differential amplifier.

7. The web velocity control system of claim 1 further comprising a second time error signals generating means, said second signals generating means comprising:

a one-shot multivibrator circuit having a time-out constant that equals the time displacement between binary signals that indicate the desired web velocity, said multivibrator being set each time a binary signal that indicates actual web velocity occurs;

logic circuit means, responsive to the output from said multivibrator, for generating a first binary output when said multivibrator is set again before it timesout and generating a second binary output when the multivibrator times-out before it is set again; and means for disabling said second time error signal generating means.

8. The web velocity control system of claim 7 wherein said web velocity correction signals generating means, comprises:

a capacitor having an initial charge thereon;

first gate means, responsive to the first binary output from said logic circuit means, for closing a discharge path for said capacitor; and second gate means, responsive to the second binary output from said logic circuit means, for closing a charge path for said capacitor.

9. The web velocity control system of claim 1, wherein said combining means comprises a two input summing amplifier, the first input being the web velocity correction signals; and wherein said dynamically storing means comprises a capacitor having an initial positive voltage charge thereon connected to the second input of said summing amplifier.

10. The web velocity control system of claim 9 further comprising:

isolation means for connecting the output of said summing amplifier to the positive side of said capacitor.

11. In a magnetic tape drive having a pre-recorded clock track on the magnetic tape and an electric motor for driving a take-up reel, a tape velocity control system, comprising:

first means for generating signals indicative of the time errors between the occurrences of binary clock signals read from the pre-recorded clock track representing actual tape velocity and binary signals representing the desired time displacement between the read clock signals;

means responsive to a binary signal indicating existence of a record longer than a predetermined length for inhibiting said first time error signals generating means;

second means for generating signals indicative of the time errors between the occurrences of binary signals representing actual tape velocity, that are occurring at a rate obtained by dividing the binary clock signal rate by a factor greater than one, and binary signals representing the desired time displacement between the binary signals representing actual tape velocity; and means, responsive to said second time error signals generating means for generating tape velocity correction signals that are proportional, in amplitude, to the voltage presently supplied to drive the take-up reel motor and equal, in duration, to the time errors indicated by the time error indicating signals.

12. The tape velocity control system of claim 11 wherein said first time error signals generating means, comprises:

a one-shot multivibrator circuit having a time-out constant that equals the time displacement desired between the binary clock signals read from the tape, said multivibrator being set each time a clock signal is read; and logic circuit means, responsive to the output from said multivibrator for generating a first binary output when said multivibrator is set again before it times-out and generating a second binary output when the multivibrator times-out before it is set again.

13. The tape velocity control system of claim 11 wherein said second time error signals generating means, comprises:

first latch means for receiving the binary signals representing actual tape velocity and generating binary signals in response thereto;

second latch means for receiving the binary signals representing the desired time displacement between the binary signals representing actual tape velocity and generating binary signals in response thereto; and logic circuit means, responsive to the binary signals from said first and second latch means, for generating a first binary output when the actual tape velocity indicating binary signals are being received prior to the desired time displacement indicating signals, and generating a second binary signal when the desired time displacement indicating signals are being received prior to the actual tape velocity indicating binary signals.

14. The tape velocity control system of claim 11 wherein said tape velocity correction signals generating means, comprises:

first gate means, responsive to said second time error indicating signal generating means for closing in response thereto;

second gate means, responsive to said second time error indicating signal generating means, for closing in response thereto; and a differential, dual input, amplifier having an inverting input and a non-inverting input, said first gate means being connected between the inverting input and ground, and said second gate means being connected between the non-inverting input and ground.

15. The tape velocity control system of claim 14 further comprising:

a two input summing amplifier, the first input being connected to the output of said differential amplifier;

a capacitor connected between the second input of said summing amplifier and ground;

a bidirectional isolation means for connecting the output of said summing amplifier to the second input of said summing amplifier and the positive side of said capacitor; and means for connecting the output of said summing amplifier to both the inverting and non-inverting inputs of said differential amplifier.

* * * * *